United States Patent
Choi

(10) Patent No.: US 9,184,616 B2
(45) Date of Patent: *Nov. 10, 2015

(54) ADD-ON COMMUNICATION APPARATUS ATTACHED TO IN-CABLE CHARGING CONTROL DEVICE AND OPERATING METHOD THEREOF

(71) Applicant: LSIS CO., LTD., Anyang-si, Gyeonggi-do (KR)

(72) Inventor: Seung Woo Choi, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 208 days.

This patent is subject to a terminal disclaimer.

(21) Appl. No.: 13/923,146

(22) Filed: Jun. 20, 2013

(65) Prior Publication Data

US 2013/0342164 A1  Dec. 26, 2013

(30) Foreign Application Priority Data

Jun. 22, 2012  (KR) .......................... 10-2012-0067426

(51) Int. Cl.
    *H02J 7/00*  (2006.01)
    *B60L 11/18*  (2006.01)
    *B60L 3/00*  (2006.01)

(52) U.S. Cl.
    CPC ............. *H02J 7/007* (2013.01); *B60L 11/1816* (2013.01); *B60L 11/1824* (2013.01); *B60L 11/1838* (2013.01); *B60L 11/1861* (2013.01);
    (Continued)

(58) Field of Classification Search
    CPC ... Y02T 90/14; Y02T 10/7005; Y02T 90/128; Y02T 10/7088; Y02T 90/163
    USPC ........................................................ 320/109
    See application file for complete search history.

(56) References Cited

U.S. PATENT DOCUMENTS 5,200,685 A * 4/1993 Sakamoto ..................... 320/103
5,654,621 A * 8/1997 Seelig .......................... 320/108

(Continued)

FOREIGN PATENT DOCUMENTS

| CN | 101587633 | 11/2009 |
| CN | 202159234 | 3/2012 |

(Continued)

OTHER PUBLICATIONS

Japan Patent Office Application Serial No. 2013-131591, Office Action dated May 2, 2014, 4 pages.

(Continued)

*Primary Examiner* — Arun Williams
(74) *Attorney, Agent, or Firm* — Lee, Hong, Degerman, Kang & Waimey

(57) ABSTRACT

Disclosed is an add-on communication apparatus attached to an in-cable charging control device integrated with a cable assembly to charge an electric vehicle. The add-on communication apparatus includes a first communication module to make wireless communication with a terminal, a second communication module to make wireless communication with the in-cable charging control device, and a control module. The control module receives a command from the terminal through the first communication module, generates a first control command based on the command, and transmits the first control command to the in-cable charging control device through the second communication module.

14 Claims, 9 Drawing Sheets

(52) U.S. Cl.
CPC ............ *B60L3/0069* (2013.01); *B60L 2230/12* (2013.01); *B60L 2230/40* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | | |
|---|---|---|---|---|
| 2009/0278492 | A1* | 11/2009 | Shimizu et al. | 320/108 |
| 2010/0174667 | A1* | 7/2010 | Vitale et al. | 705/412 |
| 2010/0306033 | A1 | 12/2010 | Oved et al. | |
| 2011/0172839 | A1 | 7/2011 | Brown et al. | |
| 2013/0175974 | A1* | 7/2013 | Bassham et al. | 320/106 |

FOREIGN PATENT DOCUMENTS

| | | |
|---|---|---|
| EP | 2455924 | 5/2012 |
| JP | 2010-061506 | 3/2010 |
| JP | 2010-110051 | 5/2010 |
| JP | 2010-110101 | 5/2010 |
| JP | 2010-148283 | 7/2010 |
| JP | 2010-284037 | 12/2010 |
| JP | 2011-015529 | 1/2011 |
| JP | 2011-172409 | 9/2011 |
| JP | 2011-250617 | 12/2011 |
| JP | 2012-075247 | 4/2012 |
| KR | 1020090125560 | 12/2009 |
| KR | 10-1011624 | 1/2011 |
| KR | 1020110052772 | 5/2011 |
| KR | 101075521 | 10/2011 |
| WO | 2010/022059 | 2/2010 |
| WO | 2010/140664 | 12/2010 |
| WO | 2012/058421 | 5/2012 |
| WO | 2012/078921 | 6/2012 |

OTHER PUBLICATIONS

Japan Patent Office Application Serial No. 2013-131591, Office Action dated Oct. 8, 2014, 8 pages.
Korean Intellectual Property Office Application Serial No. 10-2012-0067426, Office Action dated Oct. 23, 2013, 4 pages.
Korean Intellectual Property Office Application Serial No. 10-2012-0067426, Notice of Allowance dated Mar. 18, 2014, 2 pages.
The State Intellectual Property Office of the People's Republic of China Application Serial No. 201310336527.7, Office Action dated Dec. 18, 2014, 9 pages.
European Patent Office Application Serial No. 13173173.9, Search Report dated Jun. 19, 2015 9 pages.
Japan Patent Office Application Serial No. 2013-131591, Office Action dated Jun. 23, 2015, 3 pages.

* cited by examiner

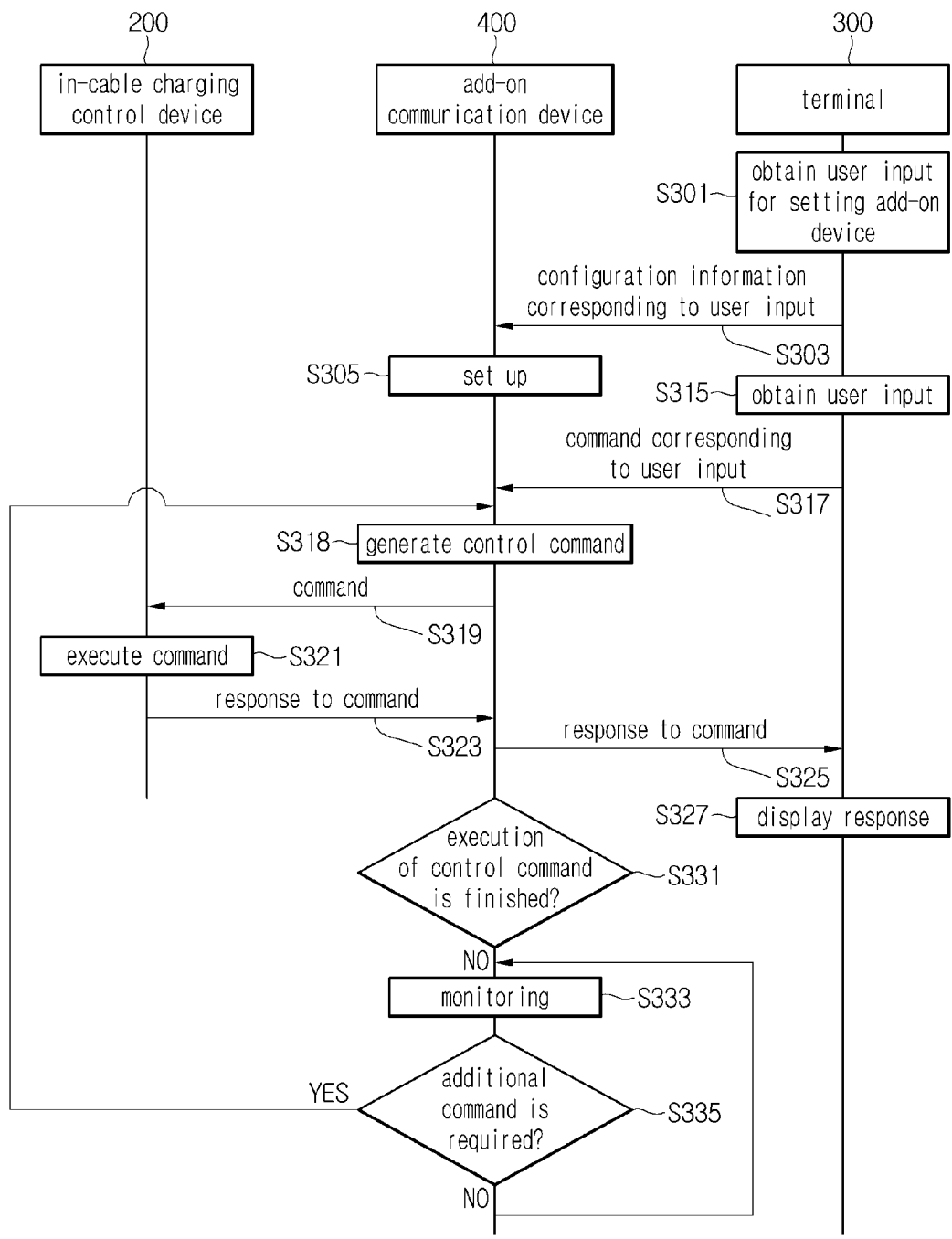

ADD-ON COMMUNICATION APPARATUS ATTACHED TO IN-CABLE CHARGING CONTROL DEVICE AND OPERATING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0067426, filed on Jun. 22, 2012, the contents of which is incorporated by reference herein in its entirety.

BACKGROUND OF THE INVENTION

The embodiment relates to the charging of an electric vehicle. The electric vehicle refers to a vehicle driven by using electricity. The electric vehicle is mainly classified into a battery powered electric vehicle and a hybrid electric vehicle. The battery powered electric vehicle is driven by using only electricity without fossil fuel, which is generally called an electric vehicle. In addition, the hybrid electric vehicle is driven by using both of the electricity and the fossil fuel. In addition, the electric vehicle is equipped with a battery to supply electricity for driving. In particular, the battery powered electric vehicle and a plug-in type hybrid electric vehicle have batteries charged with power supplied from an external power supply, and drive an electric motor by using the power charged in the battery.

When the electric vehicle is charged with 60 Hz-commercial power supplied through a household socket, an electric vehicle charging cable assembly is used.

The electric vehicle charging cable assembly includes a connector connected to the electric vehicle, a plug connected with the socket, and a power cable to link the connector to the plug.

Since the electric vehicle charging cable assembly is used under various environments, an in-cable charging control device to ensure the stable charging of the electric vehicle may be provided in the electric vehicle charging cable assembly. The in-cable charging control device is integrated with the power cable so that the in-cable charging control device is not easily separated from the power cable by a user. In order to ensure the stable charging of the electric vehicle, the in-cable charging control device must be strong against an external temperature, external moisture, vibration, and impact. If the in-cable charging control device includes a connector for wired communication, the connector may include a metal port. Accordingly, the in-cable charging control device may not satisfy the requirements described above.

However, since the user wants to check the charging state, it is necessary for the in-cable charging control device, which is integrally attached to the electric vehicle charging cable assembly, to notify the user of the charging state.

To this end, the in-cable charging control device may show the charging-related information or the failure information through LEDs having a predetermined color.

In other words, the user must personally check the in-cable charging control device with the eyes of the user in order to obtain the charging-related information. In general, the user may want to more check the charging state under the environment that it is rain, cold, or hot. However, the user feels inconvenient because the user goes out under the above weather situation to personally check the in-cable charging control device with the eyes of the user.

SUMMARY OF THE INVENTION

The embodiment provides a system, an apparatus, and a method capable of conveniently providing information related to charging of the electric vehicle to a user.

The embodiment is to maintain the characteristics of the in-cable charging control device manufactured to have the characteristics strong against an external temperature, external moisture, vibration, and impact, to facilitate the repair for the in-cable charging control device, and to conveniently provide the charging-related information of the electric vehicle to a user without increasing the cost when the in-cable charging control device is replaced with new one.

The embodiment is to minimize power consumption when power supplied to the unused add-on communication apparatus is not cut off.

According to the embodiment, there is provided an add-on communication apparatus attached to an in-cable charging control device integrated with a cable assembly to charge an electric vehicle. The add-on communication apparatus includes a first communication module to make wireless communication with a terminal, a second communication module to make wireless communication with the in-cable charging control device, and a control module. The control module receives a command from the terminal through the first communication module, generates a first control command based on the command, and transmits the first control command to the in-cable charging control device through the second communication module.

According to the embodiment, there is provided an operating method of an add-on communication apparatus attached to an in-cable charging control device integrated with a cable assembly to charge an electric vehicle. The method includes receiving a command from a terminal, generating a first control command based on the command, and transmitting the first control command to the in-cable charging control device.

BRIEF DESCRIPTION OF THE DRAWING

FIG. 9 is a ladder diagram showing the operating scheme of an electric vehicle charging system according to another embodiment.

DETAILED DESCRIPTION OF THE PREFERRED EMBODIMENT

Hereinafter, a mobile terminal according to embodiments will be described in more detail with reference to accompanying drawings. In the following description, suffixes "module" and "unit" are only added in order to facilitate the description of the specification, and may be compatibly used with each other.

A mobile terminal according to the embodiment may include a cellular phone, a smart phone, a laptop computer, a digital broadcasting receiver, PDA (Personal Digital Assistants), PMP (Portable Multimedia Player), and a navigation device. It may be easily understood by those skilled in the art that the configuration disclosed through the embodiment is applicable to a stationary terminal such as a digital TV or a desktop computer.

Hereinafter, an electric vehicle charging system 10 according to the first embodiment will be described in more detail with reference to accompanying drawings.

Figure 1:
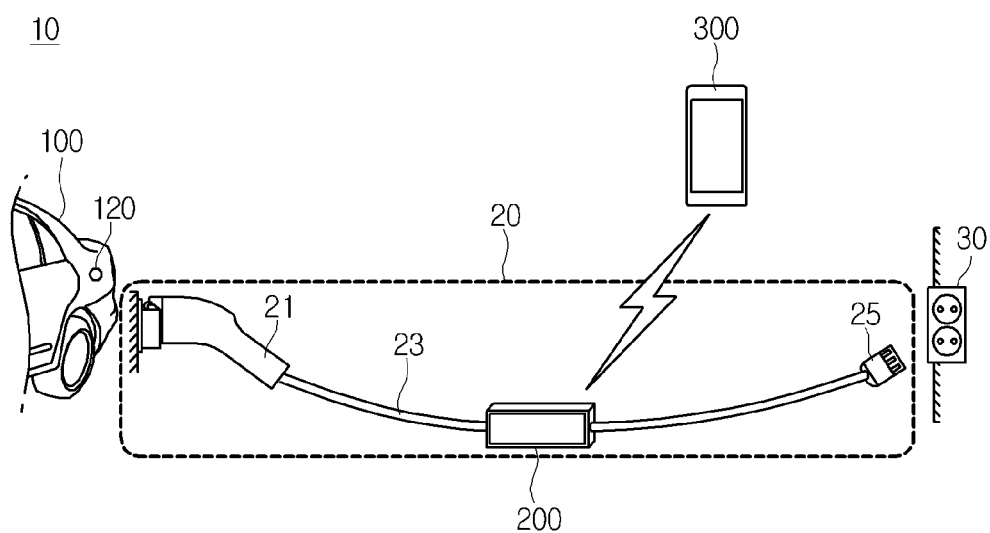
FIG. 1 is a schematic view showing an electric vehicle charging system according to one embodiment.

FIG. 1 is a schematic view showing the electric vehicle charging system 10 according to one embodiment.

Referring to FIG. 1, the electric vehicle charging system 10 according to one embodiment includes an electric vehicle 100, an electric vehicle charging cable assembly 20, a socket 30, and a terminal 300.

The socket 30 supplies AC power.

The electric vehicle 100 is connected with the socket 30 through the electric vehicle charging cable assembly 20 to receive AC power from the socket 30.

The electric vehicle charging cable assembly 20 transmits the AC power to the electric vehicle 100 from the socket 30.

The electric vehicle charging cable assembly 20 includes an in-cable charging control device 200, an electric vehicle connector 21, a power cable 23, and a plug 25.

The power cable 23 transmits the power.

The electric vehicle connector 21 is inserted into an electric vehicle inlet 120 and connected with the electric vehicle inlet 120. The electric vehicle connector 21 complies with the standard SAE J1772.

The plug 25 is inserted into the socket 30 so that the plug 25 is connected with the socket 30.

The in-cable charging control device 200 monitors the charging of the electric vehicle 100, and provides the charging-related information obtained through the monitoring work to the terminal 300, thereby controlling the charging of the electric vehicle 100. The in-cable charging control device 200 is attached to the power cable 23 integrally with the power cable 23 so that the in-cable charging control device 200 is not easily separated from the power cable 23 by a user. The in-cable charging control device 200 has the strong characteristics against an external temperature, external moisture, vibration, and impact. When the in-cable charging control device 200 includes a connector for wired communication, since the connector includes a metal port, the in-cable charging control device 200 may be weak against external conditions. In order to solve the above problem, the in-cable charging control device 200 may wirelessly transmit the charging-related information to the terminal 300.

The terminal 300 makes wireless communication with the electric vehicle charging cable assembly 20 through a non-contact scheme to display the information of the electric vehicle charging cable assembly 20.

Figure 2:
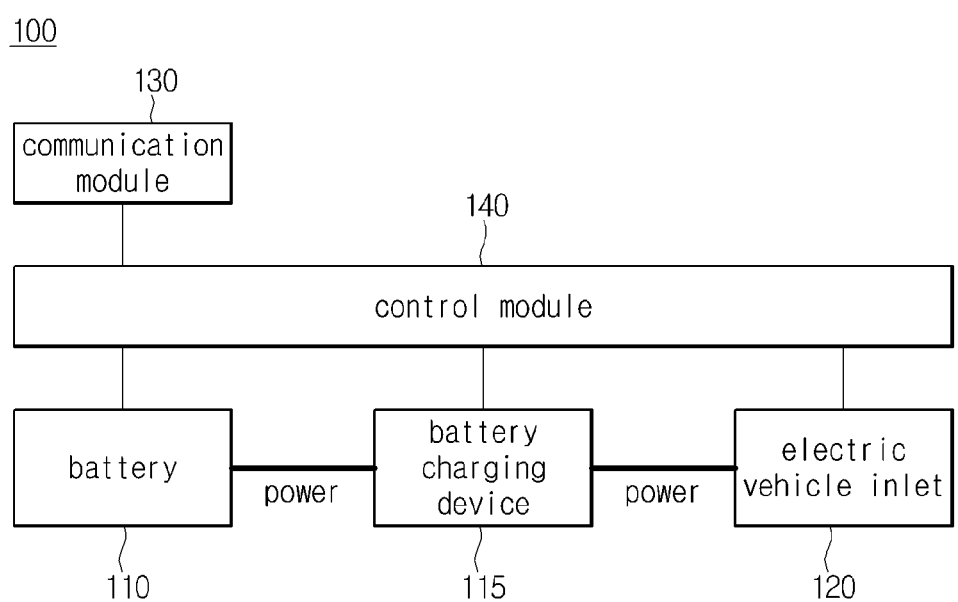
FIG. 2 is a block diagram showing an electric vehicle according to one embodiment.

FIG. 2 is a block diagram showing the electric vehicle 100 according to one embodiment.

The electric vehicle 100 includes a battery 110, a battery charging device 115, the electric vehicle inlet 120, a communication module 130, and a control module 140.

The battery 110 supplies power, which is used to operate the electric vehicle 100, to the electric vehicle 100.

The electric vehicle inlet 120 is a connector to receive external power used for the charging of the battery 110. The electric vehicle inlet 120 may comply with the standard SAE J1772.

The battery charging device 115 charges the battery with the power supplied through the electric vehicle inlet 120.

The communication module 130 may make communication with the electric vehicle charging cable assembly 20 or the terminal 300.

The control module 140 controls the overall operation of the electric vehicle 100.

Figure 3:
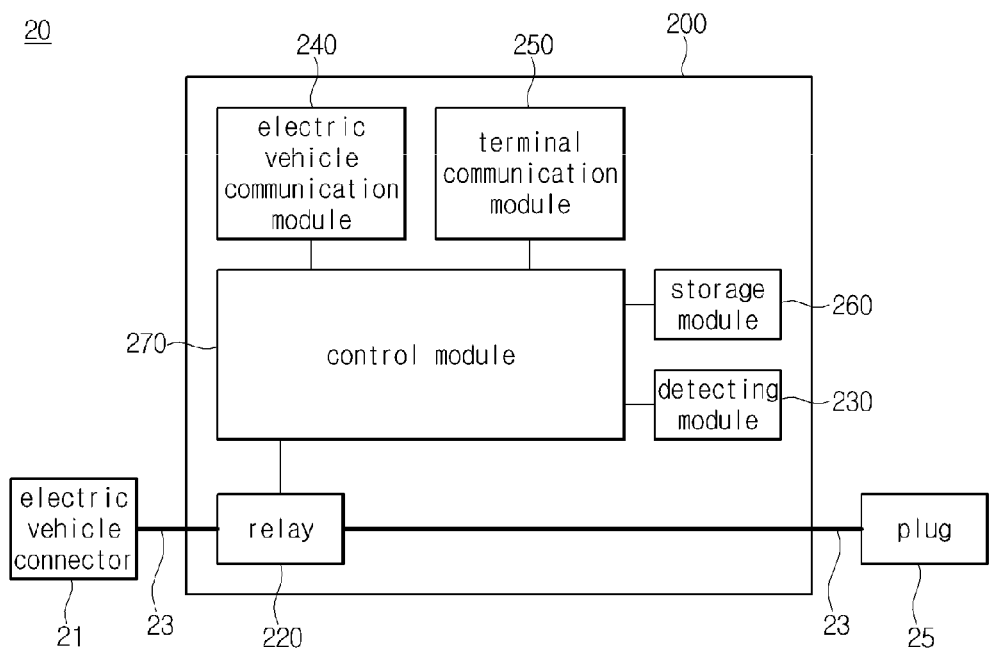
FIG. 3 is a block diagram showing an electric vehicle charging cable assembly according to one embodiment.

FIG. 3 is a block diagram showing the electric vehicle charging cable assembly 20 according to one embodiment.

As described above, the electric vehicle charging cable assembly 20 includes the in-cable charging control device 200, the electric vehicle connector 21, the power cable 23, and the plug 25.

In this case, the in-cable charging control device 200 includes a relay 220, a detecting module 230, an electric vehicle communication module 240, a terminal communication module 250, a storage module 260, and a control module 270.

The relay 220 controls the cutting off of power supply through the power cable 23. In detail, if the relay 220 is turned off, the relay 220 cuts off the power supply through the power cable 23. If the relay 220 is turned on, the relay 220 supplies power through the power cable 23.

The detecting module 230 detects the charging-related information of the electric vehicle 100 to be described later. In particular, the detecting module 230 may detect both of the information of the electric vehicle 100 and the information of the electric vehicle charging cable assembly 20. The detecting module 230 may detect the information of the electric vehicle charging cable assembly 20 instead of detecting the information of the electric vehicle 100. In detail, the detecting module 230 may include a relay fusion detecting module, a current detecting module, an internal temperature detecting module, an internal moisture detecting module, an external temperature detecting module, an external moisture detecting module, an electric leakage detecting module, and a disconnection detecting module. The relay fusion detecting module may detect the fusion state of the relay 220. The current detecting module may detect the intensity of current flowing through the power cable 23. The internal temperature detecting module may detect the internal temperature of the electric vehicle charging cable assembly 20. The internal moisture detecting module may detect the internal moisture of the electric vehicle charging cable assembly 20. The external temperature detecting module detects the surrounding temperature of the in-cable charging control device 200. The external moisture detecting module detects the surrounding moisture of the in-cable charging control device 200. The electric leakage detecting module may detect the state of the electric leakage of the electric vehicle charging cable assembly 20. The disconnection detecting module may detect the disconnection state of the electric vehicle charging cable assembly 20.

The electric vehicle communication module 240 makes communication with the electric vehicle 100. In detail, the electric vehicle communication module 240 makes communication with the communication module 130 of the electric vehicle 100. The electric vehicle communication module 240 may make communication with the communication module 130 through a power-cable communication scheme. In addition, the electric vehicle communication module 240 and the communication module 130 may make communication with each other through an infrared data association (IrDA) scheme, a radio frequency communication scheme, a Bluetooth scheme, an ultra wideband (UWB), a ZigBee scheme, and a digital living network alliance (DLNA) scheme.

The terminal communication module 250 makes communication with the terminal 300. In detail, the terminal communication module 250 makes communication with a communication module 310 of the terminal 300. In particular, the terminal communication module 250 and the communication module 310 may make communication with each other through an infrared data association (IrDA) scheme, a radio frequency communication scheme, a Bluetooth scheme, an ultra wideband (UWB), a ZigBee scheme, and a digital living network alliance (DLNA) scheme.

The storage module 260 stores various pieces of information to be described later. In detail, the storage module 260 may store the charging-related information of the electric vehicle 100. The storage module 260 may store the information of the use history of the in-cable charging control device 200. For example, the storage module 260 may store the information of the final use time point, the use time of period, and the accumulated use time of period of the in-cable charging control device 200.

The control module 270 controls the overall operation of the in-cable charging control device 200 together with the following operation.

Figure 4:
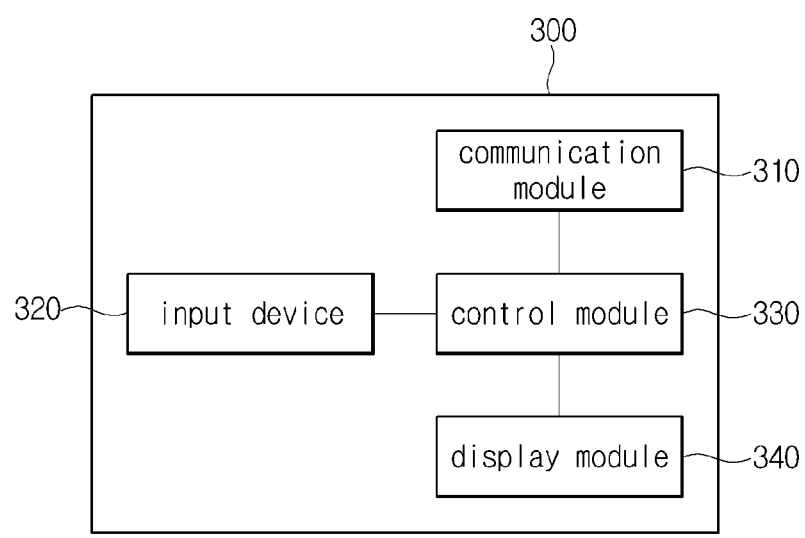
FIG. 4 is a block diagram showing a terminal according to one embodiment.

FIG. 4 is a block diagram showing the terminal 300 according to one embodiment.

The terminal 300 includes the communication module 310, an input device 320, a control module 330, and a detecting module 340.

The communication module 310 makes communication with the terminal communication module 250.

The input device 320 obtains a user input. The input device 320 may include at least one of a touch screen, a physical button, a microphone to obtain the user input having the form of a voice, an acceleration sensor to obtain the motion gesture of the terminal 300 as the user input, a keyboard, a mouse, and a keypad.

The control module 330 controls the overall operation of the terminal 300 together with the following operation.

The detecting module 340 displays the information of the charging operation and the charging state of the in-cable charging control device 200. The detecting module 340 may display the information of the failure of the in-cable charging control device 200 and the information of the action of a user dealing with the failure. For example, the detecting module 340 may display the information of the charging operation and the charging state of the in-cable charging control device 200 through visual manners including at least one of characters, geometrical figures, or light, and/or acoustic manners including sound effects.

Figure 5:
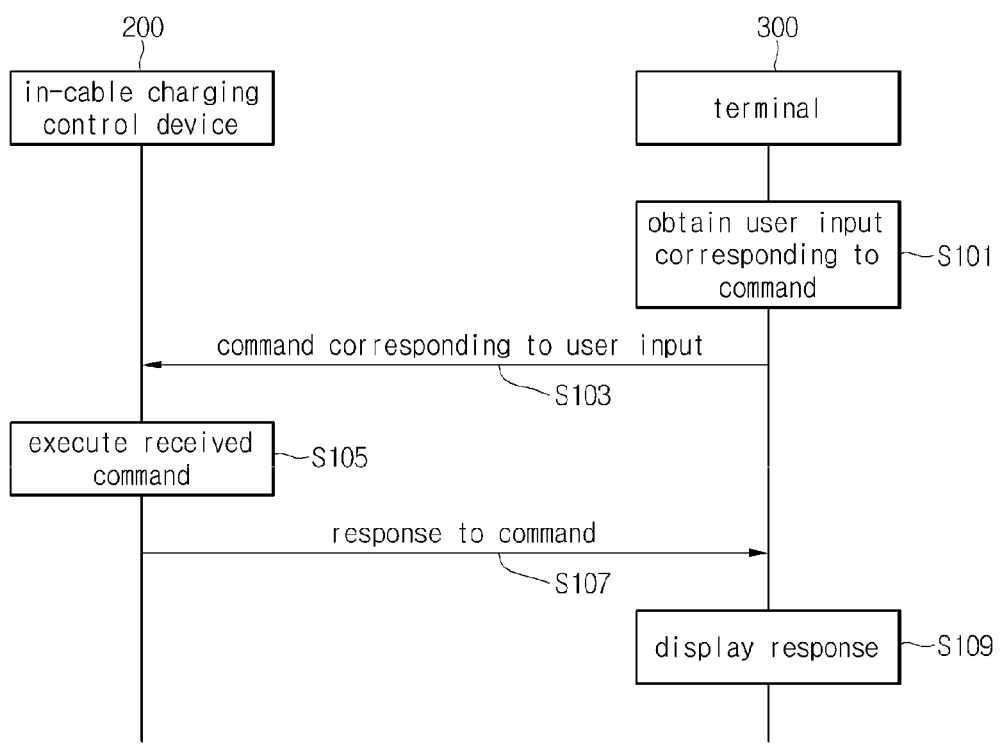
FIG. 5 is a ladder diagram showing the operating scheme of an electric vehicle charging system according to one embodiment.

FIG. 5 is a ladder diagram showing the operating scheme of the electric vehicle charging system 10 according to one embodiment.

The control module 330 of the terminal 300 obtains the user input to issue a command to the electric vehicle charging cable assembly through the input device 320 through the input device 320 (step S101). In this case, the user input to control the electric vehicle charging cable assembly 20 may include at least one of an input to start the charging of the electric vehicle 100, an input to stop the charging of the electric vehicle 100, and an input to request the charging-related information of the electric vehicle 100.

The control module 330 of the terminal 300 transmits a command corresponding to the obtained user input to the in-cable charging control device 200 through the communication module 310 (step S103). The control module 270 of the in-cable charging control device 200 receives the command through the terminal communication module 250.

The control module 270 of the in-cable charging control device 200 performs the received command (step S105).

In detail, if the command corresponding to the user input is a command to start the charging of the electric vehicle 100, the control module 270 of the in-cable charging control device 200 turns on the relay 220 that has been turned off, so that the electric vehicle charging cable assembly 20 may supply the AC power to the electric vehicle 100 through the socket 30.

If the command corresponding to the user input is a command to stop the charging of the electric vehicle 100, the control module 270 of the in-cable charging control device 200 turns off the relay 220, which has been turned on, to prevent the electric vehicle charging cable assembly 20 from charging the electric vehicle 100.

If the command corresponding to the user input is a command to request the charging-related information of the electric vehicle 100, the control module 270 of the in-cable charging control device 200 collects the charging-related information of the electric vehicle 100.

The control module 270 of the in-cable charging control device 200 transmits the response to the received command to the terminal 300 through the terminal communication module 250 (step S107).

If the command corresponding to the user input is the command to start the charging of the electric vehicle 100, the response may include the information of notifying that the relay 220 is in a turn-on state.

If the command corresponding to the user input is the command to stop the charging of the electric vehicle 100, the response may include the information of notifying that the relay 220 is in a turn-off state.

If the command corresponding to the user input is the command to request the charging-related information of the electric vehicle 100, the response may include the charging-related information of the electric vehicle 100.

The charging-related information of the electric vehicle 100 may include at least one of information of the electric vehicle 100 and the information of the electric vehicle charging cable assembly 20.

The information of the electric vehicle 100 may include at least one of an initial charging state, a present charging state, a charging start time, an estimated charging finish time, an actual charging finish time, the charging status information of the electric vehicle 100, the charging error information of the electric vehicle 100, information of the power quantity supplied to the electric vehicle 100, and the information of the intensity of current applied to the electric vehicle 100. The initial charging state and the present charging state may be represented as the ratio of a present charged power quantity to the total capacity of the battery 110. The charging status information of the electric vehicle 100 may represent whether the electric vehicle 100 is in the middle of being charged with power, the electric vehicle 100 is in the middle of waiting for charging, or the electric vehicle 100 has been completely charged.

The information of the electric vehicle charging cable assembly 20 may include at least one between the information of the charging operation of the electric vehicle charging cable assembly 20, the information of the use history of the electric vehicle charging cable assembly 20, the state information of the electric vehicle charging cable assembly 20, and the information of the failure of the electric vehicle charging cable assembly 20. The information of the charging operation of the electric vehicle charging cable assembly 20 represents whether the electric vehicle charging cable assembly 20 supplies the power, which is received through the socket 30, to the electric vehicle 100. The state information of the electric vehicle charging cable assembly 20 may include the state information of the relay 220, the information of the fusion state of the relay 220, the information of the temperature of the electric vehicle charging cable assembly 20, the information of the electric leakage of the electric vehicle charging cable assembly 20, the information of the disconnection of the electric vehicle charging cable assembly 20, and the information of surrounding environments of the electric vehicle charging cable assembly 20. The state information of the relay 220 may represent whether the relay 220 is in a turn-on state or a turn-off state. The information of the surrounding environments of the electric vehicle charging cable assembly 20 may include at least one of the information of the surrounding temperature and the information of the surrounding moisture.

The control module 330 of the terminal 300 displays the received response on the detecting module 340 (step S109).

If the command corresponding to the user input is a command of starting the charging of the electric vehicle 100, the control module 330 of the terminal 300 may display the information of notifying that the relay 220 is in the turn-on state on the display module 340.

If the command corresponding to the user input is a command of stopping the charging of the electric vehicle 100, the control module 330 of the terminal 300 may display the information of notifying that the relay 220 is in the turn-off state on the display module 340.

If the command corresponding to the user input is a command of requesting the charging-related information of the electric vehicle 100, the control module 330 of the terminal 300 may display the charging-related information of the electric vehicle 100 on the display module 340. A user may input an additional user input, which is used for controlling the electric vehicle charging cable assembly 20, to the terminal 300 through the input device 320 based on the displayed charging-related information of the electric vehicle 100.

As described above, the information of the charging operation and the state information of the electric vehicle charging cable assembly 20 are displayed through the terminal 300. Accordingly, the user may easily recognize the information of the charging operation and the state information of the electric vehicle charging cable assembly 20 through a simpler scheme. In addition, the user more easily determines the failure of the electric vehicle charging cable assembly 20 and the failed part of the electric vehicle charging cable assembly 20 based on the state information of the electric vehicle charging cable assembly 20, so that the user can easily take an action of dealing with the failure. For example, if the ground line is shorted between the electric vehicle charging cable assembly 20 and the power supply, the short of the ground line cannot be detected according to the related art. However, according to the present embodiment, the detecting module 230 detects the disconnection state, and displays the disconnection state, so that the user stops the charging of the electric vehicle charging cable assembly 20 and repairs the disconnected part or requests the repair for the disconnected part. In particular, when the information of the failure of the electric vehicle charging cable assembly 20 and the information of the action of dealing with the failure are transmitted to the terminal 300 from the in-cable charging control device 200, the user can more simply and easily detect the failure of the electric vehicle charging cable assembly 20 and take an action of dealing with the failure. Accordingly, the user can previously recognize that the electric vehicle 100 is not charged due to the failure of the electric vehicle charging cable assembly 20. In addition, for example, if the use history of the electric vehicle charging cable assembly 20 is transmitted to the terminal 300, the user can previously estimate the lifespan of the electric vehicle charging cable assembly 20 to prepare an additional electric vehicle charging cable assembly.

Meanwhile, since the electric vehicle charging cable assembly 20 may be frequently used under an inferior environment, the electric vehicle charging cable assembly 20 may be frequently repaired or replaced. However, when the electric vehicle charging cable assembly 20 has the in-cable charging control device 200 including the higher-price terminal communication module 250, it is more difficult to repair the electric vehicle charging cable assembly 20 due to the characteristics of the in-cable charging control device 200 manufactured to have the strong characteristic against the external temperature, the external moisture, the vibration, and the impact, and the replacement cost may be increased.

In order to overcome the above problem, the terminal communication module 250 may be separated from the in-cable charging control device 200. The related embodiment will be described with reference to FIGS. 6 to 9.

Figure 6:
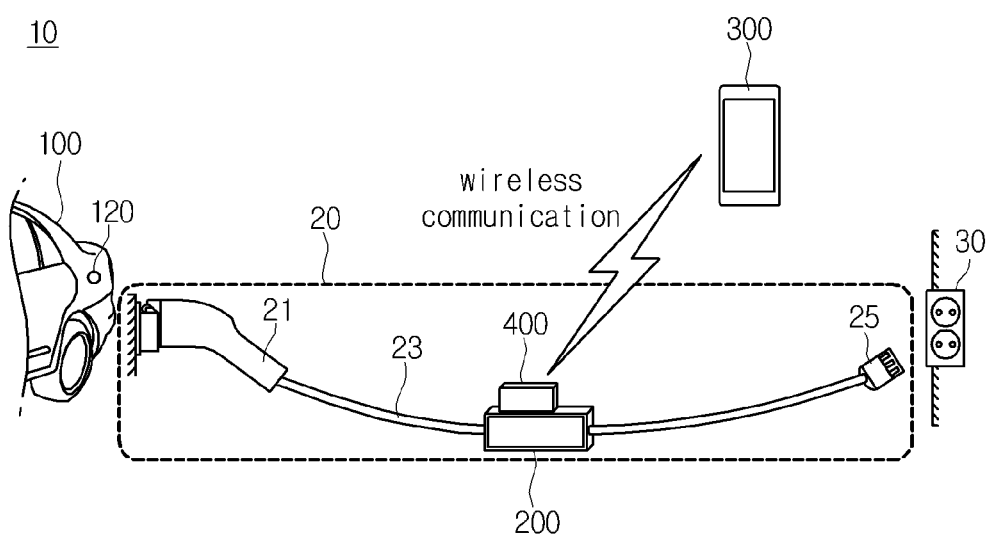
FIG. 6 is a schematic view showing an electric vehicle charging system according to another embodiment.

FIG. 6 is a schematic view showing an electric vehicle charging system according to another embodiment.

Referring to FIG. 6, an electric vehicle charging system 10 according to one embodiment includes an electric vehicle 100, an electric vehicle charging cable assembly 20, a socket 30, a terminal 300, and an add-on communication device 400.

Since the socket 30 and the electric vehicle 100 according to the present embodiment are similar to those according to the previous embodiment of FIG. 1, the details thereof will be omitted.

The electric vehicle charging cable assembly 20 transmits the AC power to the electric vehicle 100 from the socket 30.

The electric vehicle charging cable assembly 20 includes an in-cable charging control device 200, an electric vehicle connector 21, a power cable 23, and a plug 25.

Since the power cable 23, the electric vehicle connector 21, and the plug according to the present embodiment are the same as or similar to those according to the previous embodiment of FIG. 1, the details thereof will be omitted.

The in-cable charging control device 200 monitors the charging of the electric vehicle 100, and provides the charging-related information obtained through the monitoring work to the add-on communication device 400, thereby controlling the charging of the electric vehicle 100. The in-cable charging control device 200 is attached to the power cable 23 integrally with the power cable 23 so that the in-cable charging control device 200 is not easily separated from the power cable 23 by a user. The in-cable charging control device 200 has the strong characteristics against an external temperature, external moisture, vibration, and impact. When the in-cable charging control device 200 includes a connector for wired communication, since the connector includes a metal port, the in-cable charging control device 200 may be weak against external conditions. In order to solve the above problem, the in-cable charging control device 200 may make wireless communication with the add-on communication device 400.

The terminal 300 makes wireless communication with the add-on communication device 400 through a non-contact scheme to display the information of the electric vehicle charging cable assembly 20.

The add-on communication device 400 is attached to the in-cable charging control device 200. In this case, the add-on communication device 400 may be mechanically coupled with the in-cable charging control device 200. In addition, the add-on communication device 400 may be attached to the in-cable charging control device 200 by magnetic force.

Figure 7:
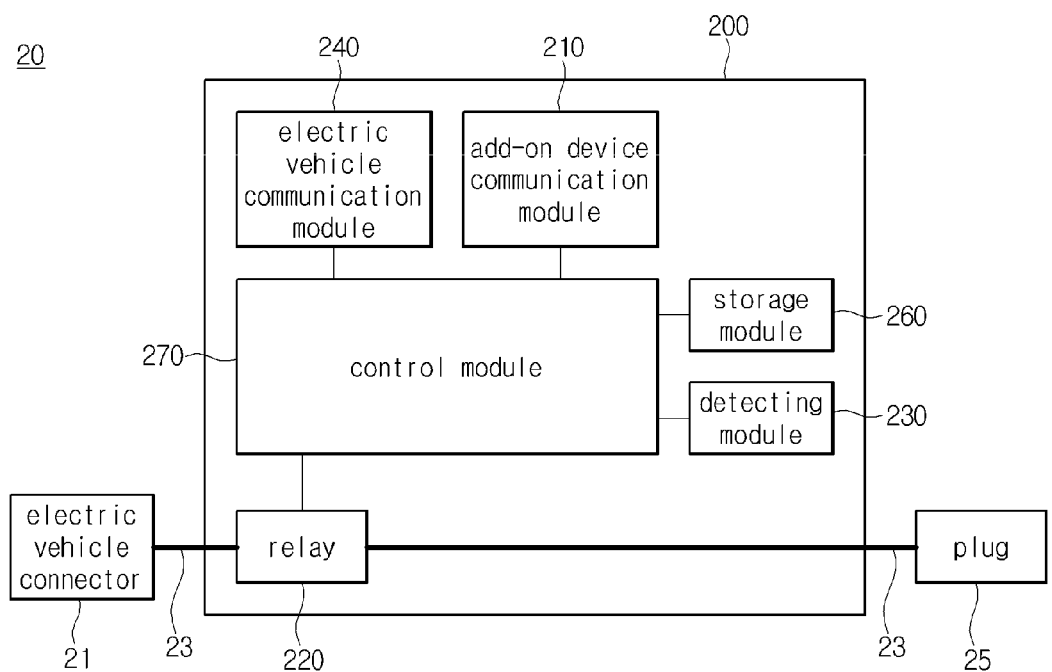
FIG. 7 is a block diagram showing an electric vehicle charging cable assembly according to another embodiment.

FIG. 7 is a block diagram showing an electric vehicle charging cable assembly according to another embodiment.

As described above, the electric vehicle charging cable assembly 20 includes the in-cable charging control device 200, the electric vehicle connector 21, the power cable 23, and the plug 25.

In this case, the in-cable charging control device 200 includes an add-on device communication module 210, a relay 220, a detecting module 230, an electric vehicle communication module 240, a storage module 260, and a control module 270. When comparing with the embodiment of FIG. 3, the in-cable charging control device 200 shown in FIG. 7 further includes the add-on device communication module 210. In addition, although the in-cable charging control device 200 shown in FIG. 7 may not have the terminal communication module 250 in order to reduce the price and the repair cost, the in-cable charging control device 200 shown in FIG. 7 may include the terminal communication module 250 according to various embodiments.

Since the relay 220, the detecting module 230, the electric vehicle communication module 240, the storage module 260, and the control module 270 according to the present embodiment are the same as or similar to those according to the previous embodiment of FIG. 3, the details thereof will be omitted.

The add-on device communication module 210 makes communication with the add-on communication device 400. The add-on device communication module 210 and the add-on communication device 400 may make communication with each other through an infrared data association (IrDA) scheme, a radio frequency communication scheme, a Bluetooth scheme, an ultra wideband (UWB), a ZigBee scheme, and a digital living network alliance (DLNA) scheme.

In particular, in order to reduce the price of the electric vehicle charging cable assembly 20 and the add-on communication device 400, the add-on device communication module 210 may employ an infrared data association (IrDa) scheme. In this case, the add-on device communication module 210 may include an infrared light emitting diode and an infrared light receiving diode.

Figure 8:
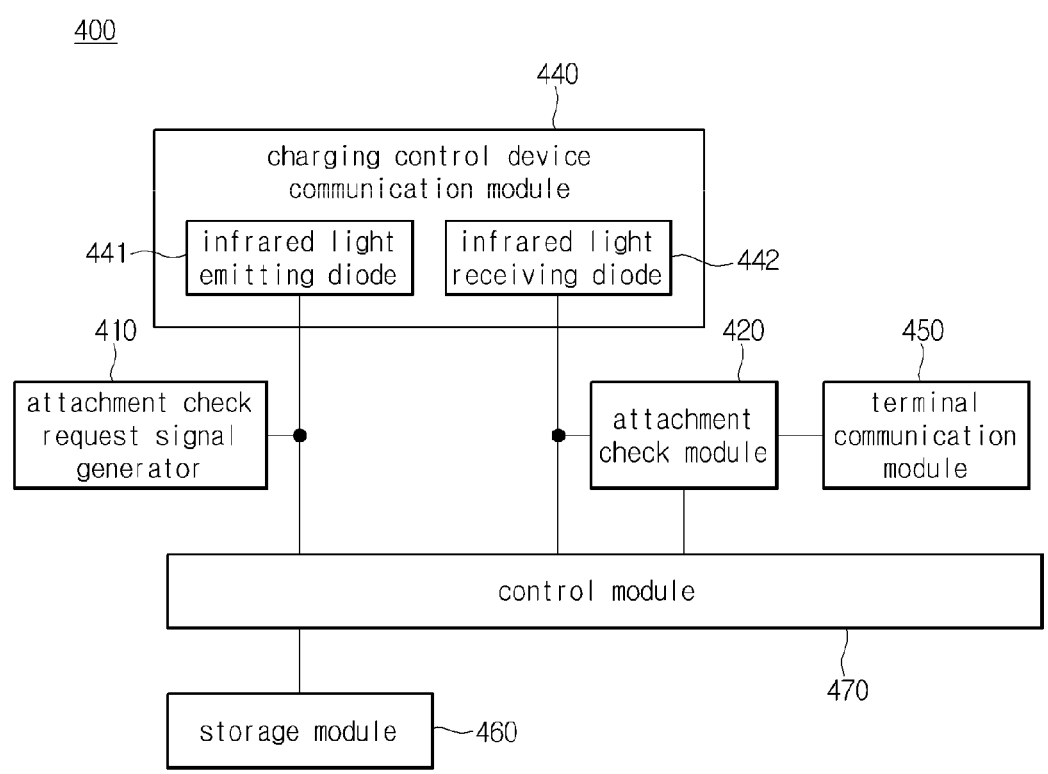
FIG. 8 is a block diagram showing an add-on communication device according to one embodiment.

FIG. 8 is a block diagram showing an add-on communication device according to one embodiment.

The add-on communication device 400 includes an attachment check request signal generator 410, an attachment check module 420, a charging control device communication module 440, a terminal communication module 450, a storage module 460, and a control module 470.

The charging control device communication module 440 makes communication with the in-cable charging control device 200. In detail, the charging control device communication module 440 makes communication with the add-on device communication module 210 of the in-cable charging control device 200. The charging control device communication module 440 and the add-on device communication module 210 may make communication with each other through an infrared data association (IrDA) scheme, a radio frequency communication scheme, a Bluetooth scheme, an ultra wideband (UWB), a ZigBee scheme, and a digital living network alliance (DLNA) scheme.

In particular, in order to reduce the price of the electric vehicle charging cable assembly 20 and the add-on communication device 400, the charging control device communication module 440 may employ an infrared data association (IrDa) scheme. In this case, the charging control device communication module 440 may include an infrared light emitting diode 441 and an infrared light receiving diode 442.

When the add-on communication device 400 is attached to the in-cable charging control device 200, the infrared light emitting diode 441 and the infrared light receiving diode 442 of the charging control device communication module 440 are matched with the infrared light receiving diode and the infrared light emitting diode of the add-on device communication module 210 of the in-cable charging control device 200, respectively, in terms of positions.

The terminal communication module 450 makes communication with the terminal 300. In detail, the terminal communication module 450 makes communication with the communication module 310 of the terminal 300. In detail, the terminal communication module 450 and the communication module 310 may make communication with each other through an infrared data association (IrDA) scheme, a radio frequency communication scheme, a Bluetooth scheme, an ultra wideband (UWB), a ZigBee scheme, and a digital living network alliance (DLNA) scheme. In particular, the terminal communication module 450 may make communication with the terminal 300 by using at least one of a wireless local area network (WLAN) such as Wi-Fi defined in IEEE 802.11 and a wireless wide area network (WWAN) defined in IEEE 802.16 or LTE (long term evolution).

The storage module 460 stores following information. In detail, the storage module 460 may store the charging-related information of the electric vehicle 100. The storage module 460 may store the information of the use history of the in-cable charging control device 200. For example, the storage module 460 may store the information of the final use time point, the use time of period, and the accumulated use time of period of the in-cable charging control device 200.

The control module 470 controls the overall operation of the add-on communication device 400 together with the following operation.

Since the add-on communication device 400 is not directly electrically connected to the in-cable charging control device 200, the add-on communication device 400 must additionally receive power. However, when a user does not use the add-on communication device 400, the user may not cut off the power supplied to the add-on communication device 400. Accordingly, since the unnecessary power consumption is increased, a scheme of minimizing power consumption when the add-on communication device 400 is not used is required.

FIG. 9 is a ladder diagram showing the operating scheme of an electric vehicle charging system 10 according to another embodiment.

The control module 330 of the terminal 300 obtains a user input to make the settings of the add-on communication device 400 through the input device 320 (step S301). The user input to make the settings of the add-on communication device 400 may include at least one of an acceptable amount of charging and a charging mode. An acceptable amount of charging may include at least one of an acceptable amount of charging at a public area and an acceptable amount of charging at a home area. The charging mode may include at least one of a charging mode at the public area and a charging mode at the home area. An acceptable amount of charging may be an absolute value represented in a unit such as Wh, or a relative value represented in a unit such as %. The set of values which can be represented by the charging mode may include a high-speed charging mode and a low-speed charging mode.

The control module 330 of the terminal device 300 transmits the configuration information corresponding to the obtained user input to the add-on communication device 400 through the communication module 310 (step S303). In this case, the configuration information may include at least one between the configuration information of an acceptable amount of charging and the configuration information of the charging mode. The configuration information of an acceptable amount of charging may include at least one between the configuration information of an acceptable amount of charging at a public area and the configuration information of an acceptable amount of charging at a home area. The configuration information of the charging mode may include at least one between the configuration information of the charging mode at a public area and the configuration information of the charging mode at a home area. Accordingly, the control module 470 of the add-on communication device 400 receives the configuration information from the terminal 300 through the terminal communication module 450.

The add-on communication device 400 stores the received configuration information in the storage module 460 so that the add-on communication device 400 is set up based on the received configuration information (step S305).

Meanwhile, the control module 330 of the terminal 300 obtains the user input to issue a command to the electric vehicle charging cable assembly 20 through the input device 320 (step S315). In this case, the user input to control the electric vehicle charging cable assembly 20 may include at least one of an input to start the charging of the electric vehicle 100, an input to stop the charging of the electric vehicle 100, and an input to request the charging-related information of the electric vehicle 100. The user input may include at least one of an input to start high-speed charging and an input to start low-speed charging.

The control module 330 of the terminal 300 transmits the command corresponding to the obtained user input to the add-on communication device 400 through the communication module 310 (step S317). The control module 470 of the add-on communication device 400 may receive the command from the terminal 300 through the terminal communication module 450. In this case, the set of values which can be represented by the command may include the starting of the charging of the electric vehicle 100, the stopping of the charging of the electric vehicle 100, and the requesting for the charging-related information of the electric vehicle 100. The set of values which can be represented by the starting of the charging of the electric vehicle 100 may include the starting of high-speed charging of the electric vehicle 100 and the starting of low-speed charging of the electric vehicle 100.

The control module 470 of the add-on communication device 400 generates a control command to control the in-cable charging control device 200 (step S318). The control module 470 of the add-on communication device 400 may generate the control command based on at least one of the command received from the terminal 300, a present position, setting information, and a charging state of the electric vehicle 100 which is a monitoring result in the following description. In this case, the set of values which can be represented by the control command may include the starting of the charging of the electric vehicle 100, the stopping of the charging of the electric vehicle 100, and the requesting for the charging-related information of the electric vehicle 100. The set of values which can be represented by the starting of the charging of the electric vehicle 100 may include the starting of high-speed charging of the electric vehicle 100 and the starting of low-speed charging of the electric vehicle 100.

According to one embodiment, if the command received from the terminal 300 is a command to start the charging of the electric vehicle 100, the control module 470 of the add-on communication device 400 may generate a control command representing the starting of the charging of the electric vehicle 100.

According to one embodiment, if the command received from the terminal 300 is a command to start the high-speed charging of the electric vehicle 100, the control module 470 of the add-on communication device 400 may generate a control command representing the starting of the high-speed charging of the electric vehicle 100.

According to one embodiment, if the command received from the terminal 300 is a command to start the low-speed charging of the electric vehicle 100, the control module 470 of the add-on communication device 400 may generate a control command representing the starting of the low-speed charging of the electric vehicle 100.

According to one embodiment, if the command received from the terminal 300 is a command to start the charging of the electric vehicle 100, and if the set charging mode is a high-speed charging mode, the control module 470 of the add-on communication device 400 may generate a control command representing the starting of the high-speed charging of the electric vehicle 100.

According to one embodiment, if the command received from the terminal 300 is a command to start the charging of the electric vehicle 100, and if the set charging mode is a low-speed charging mode, the control module 470 of the add-on communication device 400 may generate a control command representing the starting of the low-speed charging of the electric vehicle 100.

According to one embodiment, if the command received from the terminal 300 is a command to stop the charging of the electric vehicle 100, the control module 470 of the add-on communication device 400 may generate a control command representing the stopping of the charging of the electric vehicle 100.

According to one embodiment, if the command received from the terminal 300 is a command to request the charging-related information of the electric vehicle 100, the control module 470 of the add-on communication device 400 may generate a control command representing the requesting for the charging-related information of the electric vehicle 100.

According to one embodiment, if the command received from the terminal 300 is a command to start the charging of the electric vehicle 100, and if the present position is at a home area, the control module 470 of the add-on communication device 400 may generate a control command representing the starting of the charging of the electric vehicle 100 according to the charging mode at the home area. In detail, if the charging mode set at the home area is the high-speed charging mode, the control module 470 of the add-on communication device 400 may generate a control command representing the starting of the high-speed charging. If the charging mode set at the home area is the low-speed charging mode, the control module 470 of the add-on communication device 400 may generate a control command representing the starting of the low-speed charging.

According to one embodiment, if the command received from the terminal 300 is a command to start the charging of the electric vehicle 100, and if the present position is at a public area, the control module 470 of the add-on communication device 400 may generate a control command representing the starting of the charging of the electric vehicle 100 according to the set charging mode at the public area. In detail, if the charging mode set at the public area is the high-speed charging mode, the control module 470 of the add-on communication device 400 may generate a control command representing the starting of the high-speed charging. If the charging mode set at the public area is the low-speed charging mode, the control module 470 of the add-on communication device 400 may generate a control command representing the starting of the low-speed charging.

According to one embodiment, if the command received from the terminal 300 is a command to start the charging of the electric vehicle 100, and if the present position is at a home area, the control module 470 of the add-on communication device 400 may generate a control command representing the starting of the low-speed charging of the electric vehicle 100.

According to one embodiment, if the command received from the terminal 300 is a command to start the charging of the electric vehicle 100, and if the present position is at a public area, the control module 470 of the add-on communication device 400 may generate a control command representing the starting of the high-speed charging of the electric vehicle 100.

According to one embodiment, if the command received from the terminal 300 is a command to start the charging of the electric vehicle 100, and if the power supplied to the electric vehicle 100 reaches an set acceptable amount of charging according to the monitoring result, the control module 470 of the add-on communication device 400 may generate a control command representing the stopping of the charging of the electric vehicle 100.

According to one embodiment, if the command received from the terminal 300 is a command to start the charging of the electric vehicle 100, the present position is at a home area, and the power supplied to the electric vehicle 100 reaches an acceptable amount of charging set at the home area according to the monitoring result, the control module 470 of the add-on communication device 400 may generate a control command representing the stopping of the charging of the electric vehicle 100.

According to one embodiment, if the command received from the terminal 300 is a command to start the charging of the electric vehicle 100, the present position is at a public area, and the power supplied to the electric vehicle 100 reaches an acceptable amount of charging set at the public area according to the monitoring result, the control module 470 of the add-on communication device 400 may generate a control command representing the stopping of the charging of the electric vehicle 100.

To this end, the control module 470 of the add-on communication device 400 may obtain the present position of the electric vehicle 100. The control module 470 of the add-on communication device 400 may obtain the present position of the electric vehicle 100 by using at least one of GPS (global positioning system) information, base station information over the WLAN, and base station information over the WWAN.

The set of values which can be represented by the present position may include a home area and a public area.

The control module 470 of the add-on communication device 400 transmits the generated control command to the in-cable charging control device 200 through the charging control device communication module 440 (step S319). The infrared light emitting diode 441 of the charging control device communication module 440 may irradiate infrared light having a digital pattern corresponding to the generated control command.

The control module 270 of the in-cable charging control device 200 executes the received control command (step S321).

In detail, if the command corresponding to the user input is the command to start the charging of the electric vehicle 100, the control module 270 of the in-cable charging control device 200 turns on the relay 220, which has been turned off, so that the electric vehicle charging cable assembly 20 can supply the AC power to the electric vehicle 100 through the socket 30.

If the command corresponding to the user input is the command to start the high-speed charging of the electric vehicle 100, the control module 270 of the in-cable charging control device 200 turns on the relay 220, which has been turned off, so that the electric vehicle charging cable assembly 20 can supply the AC power to the electric vehicle 100 through the socket 30 at a high speed.

If the command corresponding to the user input is the command to start the low-speed charging of the electric vehicle 100, the control module 270 of the in-cable charging control device 200 turns on the relay 220, which has been turned off, so that the electric vehicle charging cable assembly 20 can supply the AC power to the electric vehicle 100 through the socket 30 at a low speed.

If the command corresponding to the user input is the command to stop the charging of the electric vehicle 100, the control module 270 of the in-cable charging control device 200 turns off the relay 220, which has been turned on, to prevent the electric vehicle charging cable assembly 20 from charging the electric vehicle 100.

If the command corresponding to the user input is a command to request the charging-related information of the electric vehicle 100, the control module 270 of the in-cable charging control device 200 collects the charging-related information of the electric vehicle 100.

The control module 270 of the in-cable charging control device 200 transmits the response to the received command to the add-on communication device 400 through the add-on device communication module 210 (step S323). The infrared light emitting diode of the add-on device communication module 210 of the in-cable charging control device 200 may irradiate infrared light having a digital pattern corresponding to the response to the received command. The control module 470 of the add-on communication device 400 may receive the response from the in-cable charging control device 200 through the charging control device communication module 440.

If the command corresponding to the user input is the command to start the charging of the electric vehicle 100, the response may include the information of notifying that the relay 220 is in a turn-on state.

If the command corresponding to the user input is the command to start the high-speed charging of the electric vehicle 100, the response may include the information of notifying that the relay 220 is in a turn-on state for high-speed charging.

If the command corresponding to the user input is the command to start the low-speed charging of the electric vehicle 100, the response may include the information of notifying that the relay 220 is in a turn-on state for low-speed charging.

If the command corresponding to the user input is the command to stop the charging of the electric vehicle 100, the response may include the information of notifying that the relay 220 is in a turn-off state.

If the command corresponding to the user input is the command to request the charging-related information of the electric vehicle 100, the response may include the collected charging-related information of the electric vehicle 100. As described above, the charging-related information of the electric vehicle 100 may include at least one of information of the electric vehicle 100 and the information of the electric vehicle charging cable assembly 20.

The control module 470 of the add-on communication device 400 transmits the received response to the terminal 300 through the terminal communication module 450 (step S325).

The control module 330 of the terminal 300 displays the received response on the display module 340 (step S327). Since the operation described in step S109 is applicable to the operation of step S327, the details of the operation of step S327 will be omitted.

Meanwhile, the control module 470 of the add-on communication device 400 checks whether the execution of the generated control command has been finished (step S331).

If the generated control command is the command to start the charging, an acceptable amount of charging is set, and the charging is not finished, the control module 470 of the add-on communication device 400 may make a determination that the execution of the generated control command is not finished.

If the generated control command is the command to stop the charging, the command to request the charging-related information of the electric vehicle 100, or the command to start the charging of the electric vehicle 100 in the state that an acceptable amount of charging is not set, the control module 470 of the add-on communication device 400 may make a determination that the execution of the generated control command has been finished.

If the execution of the received control command has been finished, the control module 470 of the add-on communication device 400 may wait for the reception of new configuration information or the reception of a new command.

If the execution of the received control command is not finished, the control module 470 of the add-on communication device 400 monitors the charging state of the electric vehicle 100 (step S333). In particular, the control module 470 of the add-on communication device 400 may monitor the quantity of power which has been supplied to the electric vehicle 100.

The control module 470 of the add-on communication device 400 checks whether an additional control command for the in-cable charging control device 200 is require based on at least one of the charging state and the configuration information of the electric vehicle 100 (step S335). In detail, the control module 470 of the add-on communication device 400 may compare the quantity of power, which has been supplied to the electric vehicle 100, with an acceptable amount of charging to check whether an additional control command for the in-cable charging control device 200 is required. If the quantity of power, which has been supplied to the electric vehicle 100, reaches a set acceptable amount of charging, the control module 470 of the add-on communication device 400 may make a determination that the additional control command for the in-cable charging control device 200 is required. If the quantity of power, which has been supplied to the electric vehicle 100, does not reach a set acceptable amount of charging, the control module 470 of the add-on communication device 400 may make a determination that the additional control command for the in-cable charging control device 200 is not required.

If the additional control command is not required, the control module 470 of the add-on communication device 400 may subsequently monitor the charging state of the electric vehicle 100.

If the additional control command is required, the control module 470 of the add-on communication device 400 generates the additional control command (step S318). Since the generation of the control command in this case has been described, the details thereof will be omitted.

According to one embodiment, the above method may be realized in the form of process-readable codes in a medium having a program recoded therein. Process-readable media may include a ROM, a RAM, a CD-ROM, a magnetic tape, a floppy disc, and an optical data storage device, and may be implemented in the form of a carrier wave (transmission through the Internet).

The mobile terminal described above is applied without limitation to the constitution and the method according to the above embodiment. The whole embodiments or parts of the embodiments can be selectively combined so that various variations and modifications are possible.

What is claimed is:

1. A communication apparatus attached to an in-cable charging control device, the in-cable changing control device integrated with a cable assembly for charging an electric vehicle, the apparatus comprising:
   a first communication module to perform wireless communication with a terminal;
   a second communication module to perform wireless communication with the in-cable charging control device; and
   a control module
   to receive a command from the terminal via the first communication module, to generate a first control command based on the received command, and to transmit the generated first control command to the in-cable charging control device via the second communication module.

2. The apparatus of claim 1, wherein the control module is further to:
   receive configuration information from the terminal via the first communication module;
   generate a second control command corresponding to the first control command based on setting information; and
   transmit the second control command to the in-cable charging control device via the second communication module.

3. The apparatus of claim 2, wherein:
   the configuration information is related to an acceptable amount of charging of the electric vehicle;
   the received command
   and the first control command represent starting of the charging of the electric vehicle;
   the second control command represents stopping of the charging of the electric vehicle; and
   the control module is further to generate the second control command when a quantity of power supplied to the electric vehicle reaches the acceptable amount of charging.

4. The apparatus of claim 3, wherein:
   the configuration information is related to the acceptable amount of charging for a home area and a public area; and
   the control module is further to:
   generate the second control command when a present location is the home area and the quantity of the power supplied to the electric vehicle reaches the acceptable amount of charging for the home area; and
   generate the second control command when the present location is the public area and the quantity of the power supplied to the electric vehicle reaches the acceptable amount of charging for the public area.

5. The apparatus of claim 1, wherein the received command represents starting of the charging of the electric vehicle.

6. The apparatus of claim 5, wherein the control module is further to:
obtain a present location of the electric vehicle; and
generate the first control command based on the received command and the obtained present location.

7. The apparatus of claim 6, wherein the present location is either a home area or a public area.

8. The apparatus of claim 7, wherein:
the first control command represents starting of the charging of the electric vehicle; and
the control module is further to:
generate the first control command representing starting of the charging in a low-speed charging mode if the present location is the home area; and
generate the first control command representing starting of the charging in a high-speed charging mode if the present location is the public area.

9. The apparatus of claim 1, wherein the control module is further to:
receive a response to the first control command from the in-cable charging control device via the second communication module; and
transmit the received response to the terminal via the first communication module.

10. The apparatus of claim 9, wherein:
the received command represents a request for charging-related information related to the electric vehicle; and
the response comprises the charging-related information.

11. The apparatus of claim 10, wherein the charging-related information comprises information related to at least the electric vehicle or the cable assembly.

12. The apparatus of claim 11, wherein the information related to the cable assembly comprises information related to at least a charging operation of the cable assembly, a use history of the cable assembly, a state of the cable assembly, or a failure of the cable assembly.

13. The apparatus of claim 12, wherein the information related to the state of the cable assembly comprises information related to at least a state of a relay in the cable assembly, a fusion state of the relay, a temperature of the cable assembly, electric leakage of the cable assembly, disconnection of the cable assembly, or a surrounding environment of the cable assembly.

14. The apparatus of claim 11, wherein the information related to the electric vehicle comprises at least an initial charging state, a present charging state, a charging start time, an estimated charging finish time, an actual charging finish time, charging status information about the electric vehicle, charging error information about the electric vehicle, information related to a quantity of power supplied to the electric vehicle, or information related to an intensity of a current supplied to the electric vehicle.

* * * * *